Aug. 8, 1939.  P. M. KYPRIE  2,168,530

METHOD OF AND MEANS FOR MAKING DENTURES

Filed Sept. 6, 1938  3 Sheets—Sheet 1

Inventor
Prodromus M. Kyprie,
By
Attorneys

Aug. 8, 1939.　　　　P. M. KYPRIE　　　　2,168,530
METHOD OF AND MEANS FOR MAKING DENTURES
Filed Sept. 6, 1938　　　3 Sheets-Sheet 2
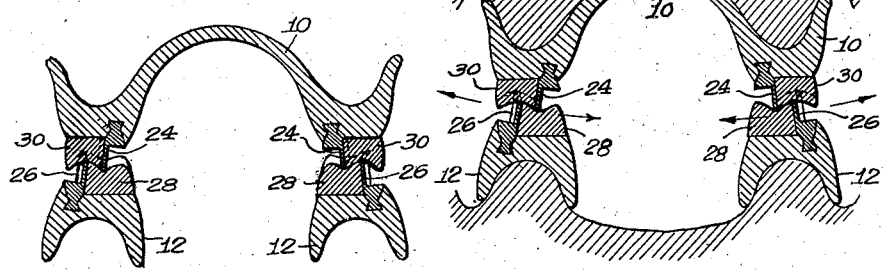
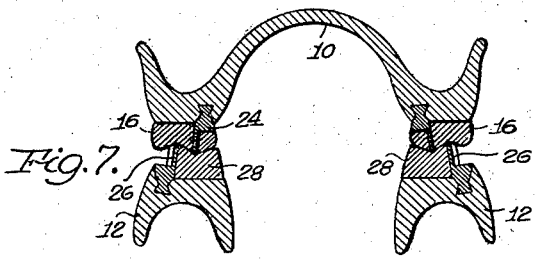
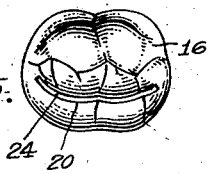
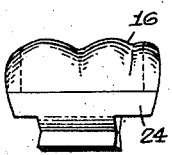
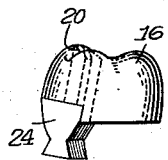
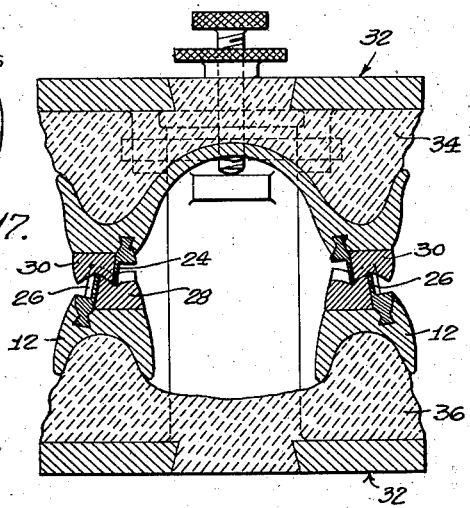
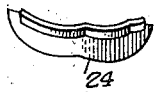
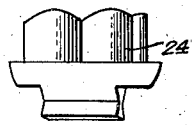
Inventor
Prodromus M. Kyprie,
By
Attorneys Aug. 8, 1939. P. M. KYPRIE 2,168,530
METHOD OF AND MEANS FOR MAKING DENTURES
Filed Sept. 6, 1938 3 Sheets-Sheet 3

Inventor
Prodromus M. Kyprie,
By
Attorneys

Patented Aug. 8, 1939

2,168,530

UNITED STATES PATENT OFFICE 2,168,530

METHOD OF AND MEANS FOR MAKING DENTURES

Prodromus M. Kyprie, Detroit, Mich.

Application September 6, 1938, Serial No. 228,504

8 Claims. (Cl. 32—2)

This invention relates, in general, to a method of and means for making dentures and, in particular, to an improved method of and novel means for properly locating and forming in the dentures the posterior teeth thereof.

Due to the two origins of lower jaw movement at the temporal fossae of the skull, which result in giving to the lower jaw, with respect to the upper jaw, a three-dimensional or ellipsoidal movement, it has been impossible for dentists to make or obtain an accurate reproduction of this movement for enabling them to form and arrange a set of artificial teeth which will give proper articulation in the mouth or, in other words, which will permit the patient to continue habitual masticating jaw movements.

Past inability to reproduce reasonably accurate records of the relative movements of the jaws has led in many cases to the formation and arrangement of artificial posterior teeth in the plates which are merely occluded, that is, teeth which are adapted only for the opening and closing movements of the jaws. In this condition or event the mandible in its movement against the occluded plane of the upper teeth encounters lack of freedom and harmony, the result being instability of the denture bases with accompanying soreness and occasional destruction of the ridges on which the denture bases are seated. This has brought about the complete destruction of the efficient and habitual masticating movements of the jaws and the formation of the articulating surfaces, thereby causing the patient to lose all definite control of the jaw movements. If by chance the dentist has succeeded, with his poor working records of and in any case, to produce a set of teeth which are articulated to some extent, that extent is for the most part not sufficient to permit the teeth to function as properly as the patient, through habit, has learned to enjoy. Also, the chances of obtaining reasonably accurate articulation are notoriously slim because each patient has a different jaw movement the unknown record of which in each case must be taken by an inaccurate method.

As soon as the natural teeth are extracted from the jaws every vestige, every trace, every nature of the relationships existing therebetween are obliterated. For a short time thereafter the temporo-mandibular movement remains anatomically, structurally and functionally unaltered. However, changes in this movement soon take place either because of the lack of dentures or because of faultily constructed dentures, and the variations in this movement that do so take place must be treated and dealt with in their existing stage. In other words, it is the present temporo-mandibular movement which is to be treated and not the movement the patient had at any time in the past.

To reproduce, record or re-establish the anatomical, functional and structural relationships of the tooth surfaces in occlusion and articulation, and also the relationship of the denture bases with each other to the yielding of the tissues on which said bases are to be borne, such reproduction, recording or re-establishment must of necessity begin with an arbitrary standard or starting point which is, as is herein disclosed, later corrected and made to assume those salutary relationships sought and which comprise the basis for harmony of and freedom in jaw movement. Heretofore and in every case the standard or starting point has been arbitrary and the process of forming and positioning the artificial teeth of the dentures has been in every case arbitrarily carried on therefrom to the finished dentures, said process lacking the corrective steps disclosed herein and said dentures necessarily and as a result being faultily made.

As has previously been said, the herein disclosed method of and apparatus for forming and positioning artificial teeth of dentures not only take into consideration the natural relationships of the tooth surfaces in articulation and occlusion but also take into consideration the relationship of the denture bases with each other to the yielding of the tissues on which said bases are to be borne. This yielding of the tissues obviously modifies or influences the respective positions of the planes of the teeth and is, therefore, a part of the function or a factor to be determined. The positions and planes of the teeth are also established by this method and apparatus without inducing strains or mal-functions of the ligaments and muscles that control the movements of the mandible. And, all of these various factors are determined because the method commences with an arbitrary arrangement which is selfcorrective, the result being harmony of function in all of the aforesaid structures when the corrections are completed.

Therefore, the main object of this invention is to provide a new and improved method of and means for forming and positioning posterior teeth of dentures more naturally and accurately than heretofore.

Another object is to provide a new and improved method of and means for reproducing records of the relative upper and lower jaw movements which more closely resemble said movements than heretofore and therefore enhance cuspidation and articulation and the continuance of the habitual movements of mastication.

Another object is to provide a new and improved method of and means for positioning posterior teeth of dentures and giving to said teeth their proper inclinations and cuspal heights and natures, whereby articulation is enhanced and the patient permitted to continue habitual movements of mastication.

Another object is to provide a new and improved method of and means for attaining the proper planes of inclination and cuspidation of posterior teeth of dentures by setting into motion a line contact with the plane of the record sought for maintaining a harmonious relationship between the cuspal surfaces with the lower jaw movement during the reproduction of said record of said lower jaw movement.

Another object is to provide a new and improved method of and means for obtaining records of the relative movements of the mandibles against not only the arbitrary planes of inclination established for the upper teeth but also and simultaneously against the true occlusal planes of the lower teeth, these records accurately reproducing the three-dimensional movement of the lower mandible relative to the maxilla and to natural temporo-mandibular articulation.

Another object is to provide means for employment in the reproduction of the natural planes of the upper and lower teeth of dentures which enable the reproduction of the natural course outlined and described by the cuspal eminences of the teeth during the process of formation and positioning thereof.

Still another object is to provide means for use in forming dentures and forming and positioning the teeth thereof whereby the movements of the lower jaw can be more accurately reproduced than heretofore, the records of said reproductions enabling the finished teeth of the dentures to have proper planes of inclination and cuspidation and practically no interferences during masticating movements.

And still another object is to provide a linear cutting edge movable in accordance with the natural jaw movements across the occlusal planes and means for reproducing records of said movements.

Other objects and advantages of the invention will become readily apparent from a reference to the following specification taken in conjunction wtih the accompanying drawings of which there are three (3) sheets and wherein:

Fig. 7 is a view similar to Fig. 2 but showing the posterior metallic teeth of the lower denture as having been removed and the space lingual to the tools thereof filled with wax;

Fig. 8 is a view similar to Fig. 7 except that the metallic upper posterior teeth have been removed and the space buccal to the tools thereof filled with wax;

Fig. 9 is a view similar to Fig. 8 except that the dentures of Fig. 8 are shown in place in an articulator, said dentures and articulator being shown in section;

Fig. 10 is a view similar to Figs. 8 and 9 except that the dentures of Figs. 8 and 9 are shown in place within the patient's mouth;

Fig. 15 is a detailed plan view of one of the metallic posterior teeth employed in the novel process of properly forming and positioning the finished teeth of dentures and showing the cutting knife or tool in place with respect thereto;

Figs. 16 and 17 are detailed front and side elevational views, respectively, of the showing in Fig. 15;

Fig. 18 is a detailed plan view of the cutting knife or tool shown in Figs. 15, 16 and 17, and Figs. 19 and 20 are detailed front and side elevational views, respectively, of the showing in Fig. 18.

Figure 1:
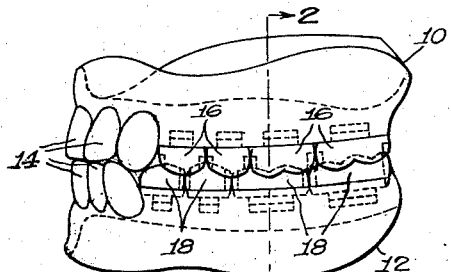
Figure 1 is a side elevation of upper and lower dentures in closed position and representing an early stage of the invented method.
Figure 2:
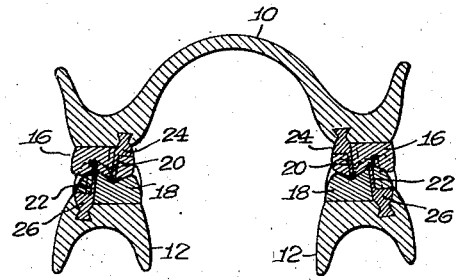
Fig. 2 is a section taken along the lines 2—2 in Fig. 1.
Figure 3:
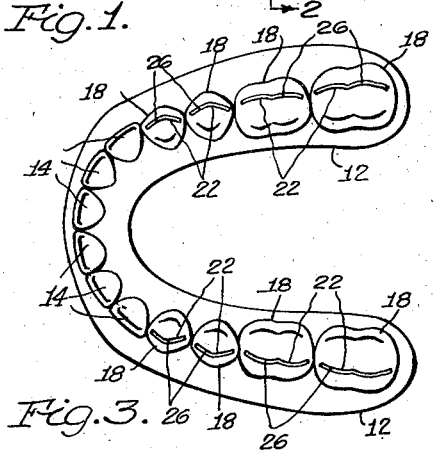
Fig. 3 is a plan view of the lower denture shown in Figs. 1 and 2.

In Figs. 1, 2 and 3 there is shown a pair of base plates 10 and 12 which are composed of any selected material and which are formed in the usual manner and by application of ordinary dental skill. This same dental skill enables the establishment of the vertical opening, that is, the space occupied by teeth when same are in contact, by use of the base plates 10 and 12 and the bite rims, that is, the known means employed for establishing the height between the jaws or mandibles. By using this knowledge and any other known and available knowledge the upper and lower anterior teeth 14 are properly positioned and set with respect to the plates 10 and 12. Then, instead of using porcelain posterior teeth as is the custom, upper and lower metallic posterior teeth 16 and 18, respectively, are set up and positioned with respect to the base plates 10 and 12, respectively, with the best available knowledge to the height of said base rims and to the occlusal plane, that is, the morsal surface of the teeth which is established when same are in contact.

Each of the metallic posterior teeth 16 in the upper base plate 10 is formed with a longitudinal slot 20 which extends vertically through the tooth and has an upper linear configuration at the crown of the tooth on the lingual side thereof following the crest of the lingual cusp. Each of the metallic posterior teeth 18 in the lower base plate 12 is also formed with a slot 22, slots 22 being similar to slots 20 except that each has a configuration at the crown of the tooth on the buccal side thereof following the crest of the buccal cusp. In each of the slots 20 is removably fitted a cutting tool 24 having a head at one end adapted for being embedded in the plate 10 and a linear cutting edge at the other end lying flush with the crest of the lingual cusp and extending along the slot 20 thereat. Into each of the slots 22 is also fitted a cutting tool 26, similar to cutting tool 24, the head thereof being embedded in plate 12 and the linear cutting edge at the other end lying flush with the crest of the buccal cusp and extending along the slot 22 thereat. Details of one of these teeth 16 and 18 and of one of these tools 24 and 26 are clearly shown in Figs. 15 through 20, the tooth therein being labeled 16 and the tool being labeled 24, it being obvious that said elements could just as well have been labeled 18 and 26, respectively. At any rate, the details in said figures clearly show the configurations of the tool-receiving slot and of the cutting edge of the tool together with the co-relation therebetween. The convexities of the cutting edge of the tool to follow the cusp and the flush nature of said cutting edge with the cuspal crest should be particularly noted because of their importance.

Figure 5:
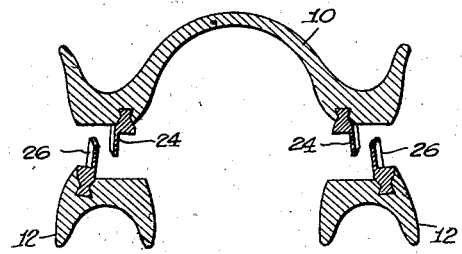
Fig. 5 is a view taken along the lines 5—5 in Fig. 4.
Figure 4:
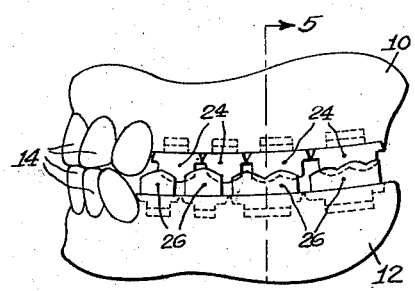
Fig. 4 is a view similar to Fig. 1 but showing the dentures without their posterior metallic teeth.
Figure 6:
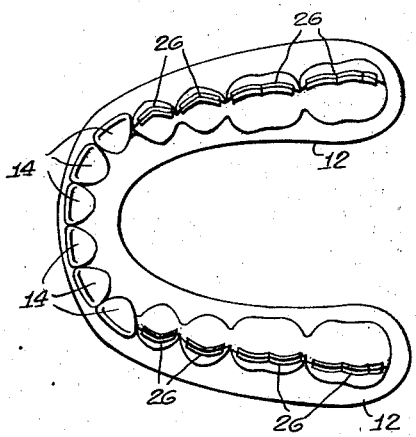
Fig. 6 is a plan view of the lower denture shown in Figs. 4 and 5.
Figure 11:
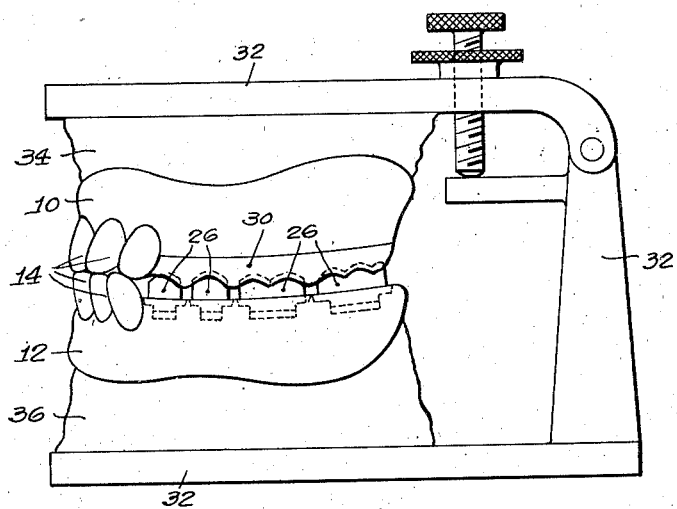
Fig. 11 is a side elevation of the showing in Fig. 9.

Figs. 4, 5 and 6 show the base plates 10 and 12 in closed position with the metallic posteriors 16 and 18 removed therefrom and the occlusal plane and vertical opening having been established by application of known methods. These figures show that the posterior teeth are removable from their cutting tools while leaving the latter embedded in their arbitrarily established positions in their respective plates, the cutting edges of said tools naturally defining the cuspal contours of the tooth removed therefrom.

Since the invention is not directed to nor dependent upon the anterior teeth 14 in either plate 10 or 12, it being assumed that ordinary dental knowledge will enable their initial proper formation, location and inclination, no further description will be given, therefore, relating thereto, said teeth being removed from said plates immediately following the positioning of the metallic teeth 16 and 18 in the above described manner.

After the metallic posterior teeth 16 and 18 have been set up in the base plates 10 and 12 to the properly determined height of the bite rims in accordance with common dental knowledge, the lower metallic posterior teeth 18 are removed from the base plate 12, leaving embedded in said base plate the tools 26, as shown in Fig. 7. The space lingual to the tools 26, and which was occupied by the teeth 18, is then filled with a carvable wax 28. While the wax 28 is still soft, plates 10 and 12 are brought together into the position shown in Fig. 7 and any excess wax is readily removed from the plate 12.

Then, as shown in Fig. 8, the upper metallic posterior teeth 16 are removed from the base plate 10, leaving embedded in said base plate the tools 24. The space buccal to the tools 24, and which was occupied by the teeth 16, is then filled with a carvable wax 30. While the wax 30 is still soft and the wax 28 substantially hardened, plates 10 and 12 are brought together into the position shown in Fig. 8 and any excess wax is readily removed from the plate 10.

The steps taken in Figs. 7 and 8 can be reversed as to time of performance without departing from the spirit of the invention, the step shown in Fig. 7 being described as taking place prior to the step shown in Fig. 8 purely and solely for the purpose of illustration. Also, the steps taken in Figs. 7 and 8 can be taken with the aid of an articulator, if desired, rather than depending upon the skill of the dentist and the nimbleness of his fingers and the pressure applied thereby, the construction and operation of said articulator being well known in the dental art.

From Fig. 8 the wax plates 28 and 30 are placed in the articulator, generally and diagrammatically illustrated in Fig. 9 at 32, said articulator being of any well known construction and set to the vertical opening already established. When in the articulator, the plates 10 and 12 are moved into the position shown in Fig. 9 by closing the articulator, and again any excess wax in the plates 28 and 30 is readily removed therefrom. It is desirable, after placing the lower base plate 12 in the articulator, to lubricate, for well known reasons, the upper surface of the wax plate 28. The articulator 32 includes mechanism for swinging the plates 10 and 12 to and from a predetermined and fixed position, said position representing the height of the bite rims already established. The articulator also includes pre-formed plaster casts 34 and 36 which have been formed in accordance with the foregoing pre-determined results and by the application of other and well-known factors, said casts 34 and 36 supporting in proper relationship the plates 10 and 12, respectively.

From the articulator 32 the base plates 10 and 12 are placed into the patient's mouth, as shown in Fig. 10, and the patient is instructed to move the lower mandible in all of its habitual and physiological movements through the full range both laterally and vertically, it being understood that the lateral path of movement is complex and includes, generally, forward, sideward, up and down, and backward movements. Therefore, during such lateral movement of the lower mandible in a generally right hand direction, it will be noted in Fig. 10 that the upper tools 24 in the right hand side of the upper base plate 10 carve the lingual cuspal formations in the right hand side of the lower wax plate 28, that the lower tools 26 in the right hand side of the lower base plate 12 carve the buccal cuspal formations in the right hand side of the upper wax plate 30, that the upper tools 24 in the left hand side of the upper base plate 10 carve the buccal cuspal formations in the left hand side of the lower wax plate 28, and that the lower tools 26 in the left hand side of the lower base plate 12 carve the lingual cuspal formations in the left hand side of the upper wax plate 30, these four carving operations taking place simultaneously during said movement of said mandible in said generally right hand direction. It will also be noted in Fig. 10 that, when the lower mandible is moved laterally in a generally left hand direction, the upper tools 24 in the right hand side of the upper base plate 10 carve the buccal cuspal formations in the right hand side of the lower wax plate 28, the lower tools 26 in the right hand side of the lower base plate 12 carve the lingual cuspal formations in the right hand side of the upper wax plate 30, the upper tools 24 in the left hand side of the upper base plate 10 carve the lingual cuspal formations in the left hand side of the lower wax plate 28, and the lower tools 26 in the left hand side of the lower base plate 12 carve the buccal cuspal formations in the left hand side of the upper wax plate 30, these four carving operations taking place simultaneously during said movement of said mandible in said generally left hand direction.

From the foregoing described operations taking place in Fig. 10, it is seen that the true records of the movements of the lower mandible with respect to the upper mandible are not only taken against the arbitrary plane established for the upper teeth but also against the true planes of the lower teeth. These records, which are the carved wax plates 28 and 30 in Fig. 10, not only establish the true planes of inclination for the upper teeth but also and simultaneously establish the occlusal planes of the lower teeth. When examined after their formation in Fig. 10, these records show a true reproduction of the three-dimensional movement natural to the temporal mandibular articulation. In other words, not only are the inclinations of these planes given by the records 28 and 30 in Fig. 10, but there is also given the course that is described by the cuspal eminences as outlined by the cutting edges of the tools 24 and 26.

Figures 12, 14:
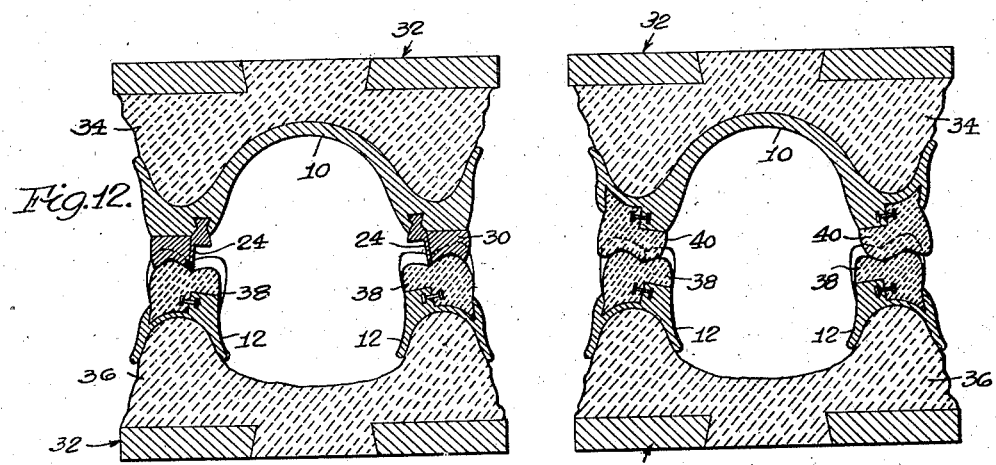
Fig. 12 is a view similar to Fig. 9 but showing the lower denture as having been replaced by the newly formed lower denture having accurately formed and positioned porcelain posteriors properly supported in the newly formed lower base plate.
Fig. 14 is a combined view of Figs. 12 and 13 and showing the newly formed lower denture of Fig. 12 and the newly formed upper denture of Fig. 13 in position in the articulator and ready for being processed in the ordinary and well-known manner into finished dentures.

After the wax records 28 and 30 have been carved in accordance with the description relating to Fig. 10, the plates 10 and 12 carrying said records are removed from the patient's mouth, and the plate-record unit 10—30, as shown in Fig. 12, is then replaced into the articulator 32 in the same position it occupied in Fig. 9. With the record 30 so in place and representing the true height and occlusal surface of the dentures desired, it is possible to select a proper number of porcelain posterior teeth 38 which are manufactured in the ordinary manner and universally employed by dentists in denture work, set these teeth into a newly and arbitrarily formed base plate 112 which is formed similarly to plate 12, and then grind the biting surfaces of said teeth 38 and carve away the recessed portions of the gum surfaces of said plate 112 until the plate unit 112—38 is capable of seating on the cast 36 of the closed articulator 32 in perfect occlusion and articulation with the upper unit 10—30 seating on the cast 34. The foregoing is the preferred method of establishing the lower denture in accordance with the upper record and is shown in Fig. 12, but it is possible, instead of employing and forming the new plate 112, to employ the old plate 12 (without the record 28 thereon) and carve it into the form that plate 112 finally assumes and which form thereof is shown in said Fig. 12.

Figure 13:
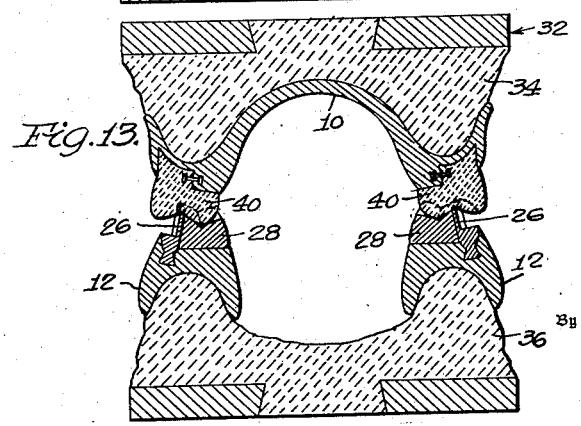
Fig. 13 is a view similar to Fig. 9 but showing the upper denture as having been replaced by the newly formed upper denture having accurately formed and positioned porcelain posteriors properly supported in the newly formed upper base plate.

Then, as shown in Fig. 13, the plate unit 112—38 of Fig. 12 is removed from the cast 36 and replaced by the plate-record unit 12—28 of Fig. 10, and the plate-record unit 10—30 is removed from the cast 34. Porcelain posterior teeth 40, which are similar to the teeth 38 before the latter were ground in the step shown in Fig. 12, are selected and then built into a newly and arbitrarily formed base plate 110 which is formed similarly to plate 10. The biting surfaces of the teeth 40 and the recessed gum surface of the plate 110 are then ground and carved until the articulator 32 can be closed with the teeth 40 and the record 28 becoming properly occluded and articulated. The foregoing is the desired method of forming the upper denture, but it could be modified. For instance, instead of forming the new plate 110, the old plate 10 could be employed and formed into the form finally assumed by plate 110 in Fig. 13, in which event the record 30 will have been removed therefrom. Also, though error might enter into the process, the final upper denture 110—40 of Fig. 13 could be formed in accordance with the final lower denture 112—38 of Fig. 12 rather than in accordance, as shown, with the plate-record unit 12—28.

Then, having set and ground the porcelain posteriors 38 in the carved lower base plate 112 to the upper wax record 30, as shown in Fig. 12, and having set and ground the porcelain posteriors 40 in the carved upper base plate 110 to the lower wax record 28, as shown in Fig. 13, said carved plates 110 and 112 with their respective ground porcelain posteriors 40 and 38 established thereon are re-inserted into the articulator 32, the articulator being then closed and the teeth 38 and 40 being brought into contact and finally set with respect to each other and to their base plates according to the best dental skill and knowledge.

After the steps have been taken in Fig. 14, the ordinary dental operator is well acquainted with the necessary steps to be taken for finally processing the plates 110 and 112, with their teeth 40 and 38, into finished dentures, so same will not be mentioned herein.

In brief, the herein described method embodies coordinating the artificial elements of the dentures, that is, the bases and the tooth planes or surfaces, with respect to the functions of the existing, individual, natural and physiological structures. As the method proceeds, these functions are performed in situ through the use of a mechanical unit actuated or motivated by the living structures, the result becoming one of concerted, consonant and harmonious relationship as similar and true as the relationship which is governed by the bio-chemical entities in normal dental arches created by nature. The inter-relationship between the elements concerned in making it possible to create a substitute mechanism giving efficient mastication, phonation and other desired results (when the natural teeth have been lost or destroyed) is re-created in toto by the method herein detailed, said method also determining this inter-relationship in various stages with regard to the influence and inter-play between the elements concerned. The position and condition of the bases and the teeth attached thereon receive their being from and inexorably follow a dictated course which emanates from the nature, extent, habits, abnormalities and peculiarities of the individual temporo-mandibular movement and the reaction of tissues supporting the bases. And, a record of this movement and reaction is obtained, interpreted and used because all the structures concerned are made to take part in the production of said record.

Although the invention has been described with some detail it is not intended that such description be definitive of the limits of the inventive idea. The right is reserved to make such changes as will come within the purview of the attached claims.

What I claim is:

1. The method of making dentures which includes, approximately establishing the relationship between the upper and lower mandibles in their normal closed position, approximately setting the posterior teeth of the upper and lower dentures in accordance with this relationship, providing the posterior teeth of one of the dentures with a cuspal carving edge and replacing the posterior teeth of the other denture with a carvable material, and setting the dentures it motion according to habitual mandibular movements for causing the carving edge to carve a record on the carvable material of and in accordance with said mandibular movements.

2. The method of making dentures which includes, approximately establishing the relationship between the upper and lower mandibles in their normal closed position, approximately setting the posterior teeth of the upper and lower dentures in accordance with this relationship, providing the lingual cuspal formations of the posterior teeth of the upper denture with a carving edge, replacing the posterior teeth of the lower denture with a carvable material, and moving the dentures according to habitual mandibular movements for causing the carving edge to carve and reproduce a record of and in accordance with said mandibular movements on the carvable material.

3. The method of making dentures which includes, approximately establishing the relationship between the upper and lower mandibles in their normal closed position, approximately setting the posterior teeth of the upper and lower dentures in accordance with this relationship, providing the buccal cuspal formations of the posterior teeth of the lower denture with a carving edge, replacing the posterior teeth of the upper denture with a carvable material, and moving the dentures according to habitual mandibular movements for causing the carving edge to carve and reproduce a record of and in accordance with said mandibular movements on the carvable material.

4. The method of making dentures which includes, approximately establishing the relationship between the upper and lower mandibles in their normal closed position, approximately setting the posterior teeth of the upper and lower dentures in accordance with this relationship, providing the lingual cuspal formations of the posterior teeth of the upper denture and the buccal cuspal formations of the posterior teeth of the lower denture with linear cutting edges, maintaining these cutting edges and replacing the upper posterior teeth with carvable material buccal to the lingual cutting edges thereat and the lower posterior teeth with carvable material lingual to the buccal cutting edges thereat, and setting into motion the dentures according to habitual mandibular movements for carving records on the upper and lower carvable materials by the lower and upper cutting edges of said mandibular movements.

5. A trial tooth for use in the manufacture of a denture comprising, a tooth body having a cuspal formation, a slot through said body at said cuspal formation, and a cutting tool removably disposed in said slot and terminating at said cuspal formation.

6. A trial tooth for use in the manufacture of a denture comprising, a tooth body having a cuspal formation, a slot extending substantially vertically through said body from along said cuspal formation, and a cutting tool freely mounted in said slot and terminating at said cuspal formation.

7. A trial tooth for use in the manufacture of a denture comprising, a tooth body having a cuspal formation, a slot extending through said body and along the contour of said cuspal formation, and a tool disposed in said slot and having a cutting edge flush with said cuspal formation, said tool and said body being readily separable from each other.

8. A trial tooth for use in the manufacture of a denture comprising, a tooth body having a cuspal formation, a slot extending through said body and along the contour of said cuspal formation, and a tool disposed in said slot and having a cutting edge at one end flush with said cuspal formation and a base at the other end for being embedded in the denture, said body being readily separable from said tool while the latter is so embedded in the denture.

PRODROMUS M. KYPRIE.